Feb. 8, 1966  L. T. HAGLE  3,233,367
EMBEDDED CEMETERY FLOWER CONTAINER
Filed July 5, 1963

INVENTOR.
LOVYL T. HAGLE
BY Eugene M. Eckelman
ATTORNEY

United States Patent Office

3,233,367
Patented Feb. 8, 1966

3,233,367
EMBEDDED CEMETERY FLOWER CONTAINER
Lovyl T. Hagle, % H & H Signal Co.,
1333 SE. 45th, Portland 15, Oreg.
Filed July 5, 1963, Ser. No. 292,928
6 Claims. (Cl. 47—41.1)

This invention relates to new and useful improvements in flower containers and is particularly adapted for use as a flower container for cemeteries.

A primary object of the present invention is to provide a flower container which employs a base portion and a vase portion, these portions having a novel structure wherein the vase is telescopically received in the base and is adapted to be inverted for use or non-use thereof, and including means for latching the vase to the base in each of such positions.

Another object is to provide a flower container of the type described employing novel latch or catch means for maintaining the vase in each of its use or non-use positions.

Still another object is to provide a flower container of the type described having improved structure designed to prevent burrowing animals from filling the base when the container is not in use.

Yet another object is to provide a flower container as above described employing a removable bottom wall to which is secured an upright supporting unit, wherein a vase may be seated on the supporting unit and elevated in part above a base in a position of use, or when inverted is enclosed fully within the base and locked to the latter.

Briefly stated, the flower container of the present invention comprises a base which is embedded in the ground and a vase which is telescopically received in the base. In one form of the invention the base has an integrated bottom wall upon which is supported catch means, and the vase has inwardly rolled ends adapted to be engaged by the catch means. The bottom wall of the vase is spaced inwardly from the bottom edge to facilitate locking of the vase while in its upright relation. In a second form, the bottom wall of the base carries a supporting unit which is adapted to support the vase in elevated position and which in an inverted position of the vase is adapted to lock it in place. As a further improvement the bottom wall of the base which carries the supporting unit may be removable wherein the supporting unit may function to elevate the vase or if desired it may be removed in order that the vase in its upright position is disposed flush with the base portion.

The invention will be better understood and additional objects thereof will become more apparent from the accompanying specification and claims considered together with the accompanying drawings, wherein like numerals of reference indicate like parts, and wherein:

Figure 2:
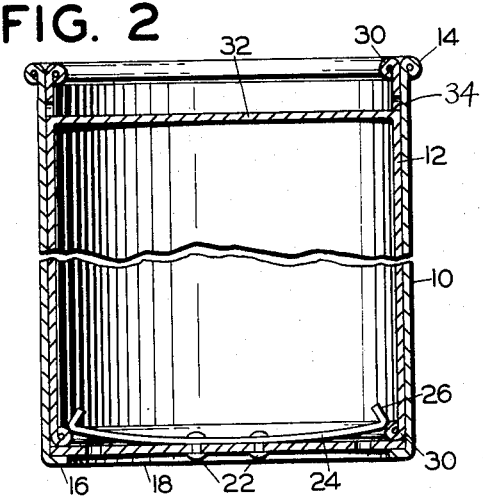
FIGURE 2 is a foreshortened vertical sectional view of the form of FIGURE 1 but showing the vase in its inverted or non-use position.
Figure 1:
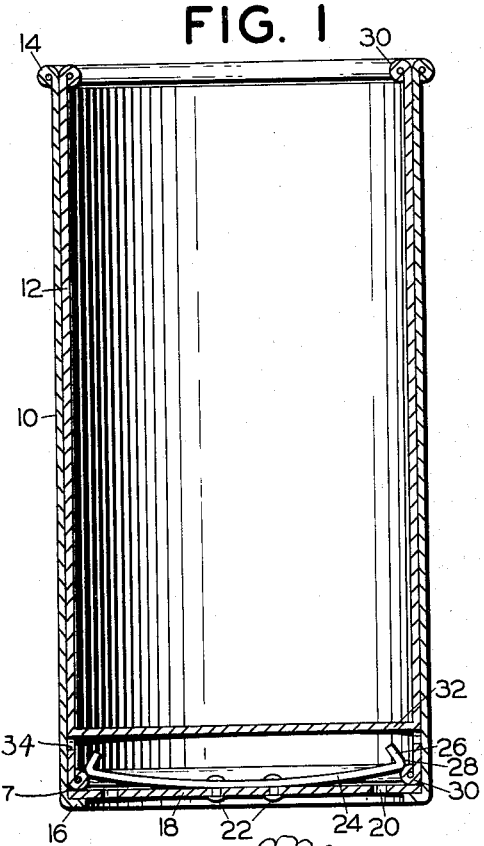
FIGURE 1 is a vertical sectional view through a first form of the invention and showing the vase in its upright or use position.

Referring now in detail to the drawings, and first to FIGURES 1 and 2, a first form of the present flower container comprises a base or fixed portion 10 and a vase or removable portion 12, the latter portion being telescopically received in the base. Base 10 is adapted to be embedded in the ground with its upper edge substantially flush with the top surface of the ground.

The upper end of the base 10 is rolled outwardly at 14 for ornamentation as well as for strength purposes, and the bottom of the base has an inturned flange 16 upon which is seated and preferably secured as by spot welding 17 a bottom wall 18, but such welding may be omitted if desired. Bottom wall 18 is provided with one or more apertures 20 which serve as drain holes for the base.

Secured to the bottom wall 18, as by rivets 22 is a leaf spring catch 24 arcuate in its length and having upturned ends 26. The outer edges 28 of the catch 24 are rounded.

The vase 12 has inwardly rolled ends 30, which serve important functions as will be seen, and a bottom wall 32 located upwardly a short distance from the bottom end.

The vase 12 may be supported upright as shown in FIGURE 1 which comprises a use position or it may be inverted into a non-use position as shown in FIGURE 2. In each position the upper end of the vase 12 is flush with the upper end of the base 10 and also in each of these positions the rolled portion 30 of the downwardly disposed end is engaged under spring catch 24 whereby the vase is latched in place.

For the purpose of engaging and latching the rolled edges 30, the spring 24 terminates short of the sides of the base portion a distance slightly less than the thickness of the rolled edges 30. Thus, a snap engagement is provided in moving the rolled edges thereby. The spring 24 is sufficiently arcuate to receive the rolled edges 30 thereunder, the upturned ends 26 forming a flared opening for the reception of the rolled edges, and is sufficiently rigid to more or less maintain its shape while the rolled edges 30 are being moved past it.

Rolled edges 30, in addition to serve as locking edges for the vase, also provide a convenient finger gripping edge for raising the vase from either of its positions in the base portion.

In the form of the invention just described, the vase is securely latched in each of its positions. Therefore, when it is disposed in its upright position it will nevertheless remain in place even though surface water should rise to a point higher than the bottom of the vase. Thus, the vase cannot float upwardly. This is also true when the vase is inverted since it is latched in both positions. Also, it is apparent that since the base portion employs a bottom wall 18, burrowing animals cannot push dirt up into the base which would prevent the vase from being inserted fully into the base.

Vase 12 is provided with apertures 34 in its side walls on the bottom side of bottom wall 32 to allow drainage of water therethrough. Thus, rain or sprinkler water can seep downwardly between the base 10 and vase 12 and out bottom apertures 20.

Figure 3:
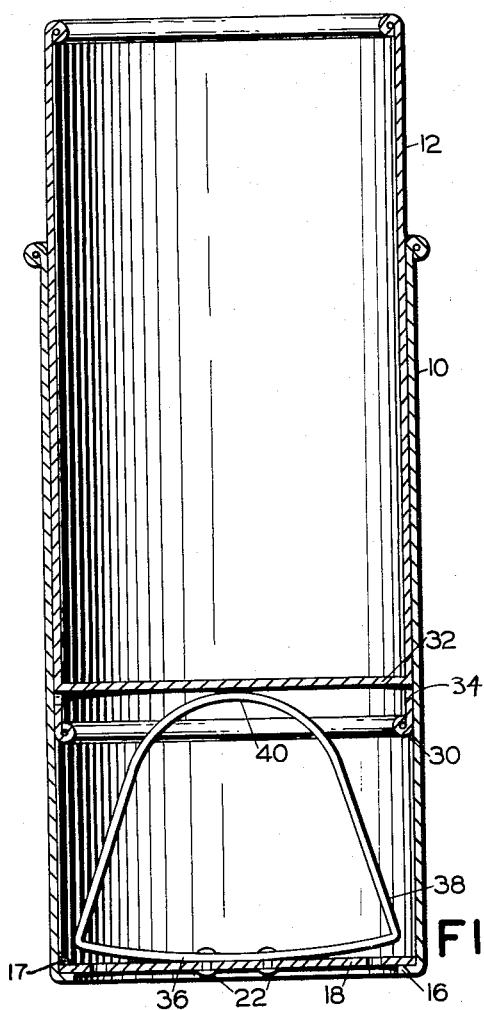
FIGURE 3 is a vertical sectional view through another form of the invention, employing a supporting unit in the base for elevating the vase when in use.
Figure 4:
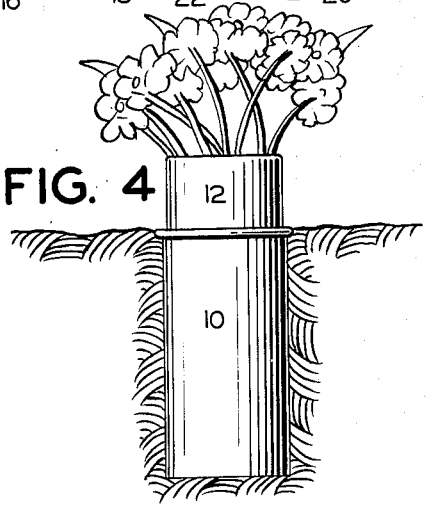
FIGURE 4 is an elevational view of the vase of FIGURE 3 as embedded in the ground.

FIGURES 3 and 4 show a form of the invention which is similar to the form shown in FIGURES 1 and 2 in having a base 10 and base 12 but in the place of spring catch 24 there is employed a spring catch 36 which serves also as a vase supporting unit. Spring catch 36 is shaped similar to catch 24 except that it has upturned leg portions or extensions 38 joined by an arcuate upper section 40. Similar to catch 24 the transverse dimension of the catch 36 is less than that of the base 10 in order that the rolled edges 30 of the vase can move thereby.

In the upright position or use position of the vase 12, the bottom wall 32 thereof seats on arcuate portion 40 wherein the upper portion of the vase projects above the ground as seen in FIGURE 4. The vase is not latched to the base in this position but upon being inverted the rolled edge 30 normally at the top end is in latched engagement with catch 36.

Similar to the embodiment of FIGURE 1, the bottom wall 18 of the embodiment of FIGURE 3 may be secured to the flange 16 as by spot welding 17, but such welding may be omitted if desired to provide removal of the bottom wall. Thus, if it is desired that the top of the vase be flush with the top of the base in its use position the bottom wall 18 can be removed and the vase seated on the flange 16. The bottom 18 may be inserted when it is desired to elevate the vase as shown in FIGURE 3 and it may remain in place when the vase is inverted in a non-use position.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A cemetery flower container comprising a tubular base portion adapted to be embedded in the ground with the upper edge thereof substantially flush with the ground, said base portion having a bottom wall and an open upper end, a vase portion removably mounted in said base portion and adapted to be positioned therein in either an upright position or an inverted position, said vase portion having a bottom wall and an open upper end, a latch element on the upper end of said vase portion comprising an inwardly rolled edge portion, and a latch element on the bottom wall of said base portion adapted for latching engagement with the said inwardly rolled edge portion on said vase portion to latch the latter in an inverted position thereof.

2. The cemetery flower container of claim 1 wherein said latch element on said base portion comprises a transversely disposed leaf spring.

3. The cemetery flower container of claim 1 wherein said latch element on said base portion comprises a transversely disposed arcuate leaf spring.

4. The cemetery flower container of claim 1 wherein said latch element on said base portion comprises a transversely disposed leaf spring having upwardly disposed extensions leading to an upper connecting section, said latch element on the base portion forming a support engageable by the bottom wall of said vase portion in its upright position for elevating the latter and forming a latch for the vase portion in its inverted position.

5. A cemetery flower container comprising a tubular base portion adapted to be embedded in the ground with the upper edge thereof substantially flush with the ground, said base portion having a bottom wall and an open upper end, a vase portion removably mounted in said base portion and adapted to be positioned therein in either an upright position or an inverted position, said vase portion having a bottom wall and an open upper end, an inwardly turned latch element on the upper end of said vase portion, and a latch on the bottom wall of said base portion comprising a transversely disposed leaf spring terminating short of the sides of said base portion and having latch edges, said leaf spring having upwardly disposed extensions leading to an upper connecting section, said latch element on the base portion forming a support by engagement of the bottom wall of said vase portion in an upright position of the latter with said upper connecting section and forming a latch for the vase portion in an inverted position of the latter for engagement of the latch edges of said leaf spring with the inwardly turned latch element on the upper end of said vase portion.

6. The cemetery flower container of claim 5 wherein the lower end of said base portion is open and has an inwardly turned flange, and said bottom wall of said base portion is freely supported on said flange and arranged to be removed from said base portion.

References Cited by the Examiner
UNITED STATES PATENTS

| | | | |
|---|---|---|---|
| 1,899,400 | 2/1933 | Shaw | 47—41.1 |
| 1,907,775 | 5/1933 | Flook | 47—41.1 |
| 2,094,129 | 9/1937 | Manahan | 47—41.1 |
| 2,208,501 | 7/1940 | Hagle | 47—41.1 |
| 2,754,625 | 7/1956 | Rasmussen | 47—41.1 |

ABRAHAM G. STONE, *Primary Examiner.*

T. GRAHAM CRAVER, *Examiner.*